United States Patent

Groll et al.

[11] 3,932,419
[45] Jan. 13, 1976

[54] QUINOPHTHALONE DYESTUFFS

[75] Inventors: Manfred Groll; Volker Hederich, both of Cologne; Hans-Samuel Bien, Burscheid, all of Germany

[73] Assignee: Bayer Aktiengesellschaft, Leverkusen-Bayerwerk, Germany

[22] Filed: May 25, 1973

[21] Appl. No.: 363,990

[30] Foreign Application Priority Data
May 27, 1972 Germany............................ 2225960

[52] U.S. Cl. .......... 260/289 QP; 8/1 D; 260/251 R; 260/256.4 C; 260/283 S; 260/287 H; 260/287 G; 260/289 H; 260/295 R; 260/326.8; 260/332.2; 260/346.8 R; 260/347.3
[51] Int. Cl.$^2$......................................... C09B 215/00
[58] Field of Search....... 260/289 R, 287 R, 289 QP

[56] References Cited
UNITED STATES PATENTS
3,687,929 8/1972 Ramanathan.................. 260/289 QP
FOREIGN PATENTS OR APPLICATIONS
1,199,098 12/1968 United Kingdom .......... 260/289 QP Primary Examiner—Donald G. Daus
Assistant Examiner—Mary C. Vaughn
Attorney, Agent, or Firm—Plumley & Tyner

[57] ABSTRACT

Quinophthalone dyestuffs of the formula

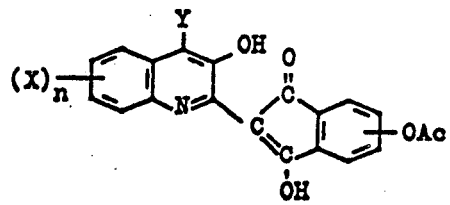

in which Ac denotes an acyl radical, X denotes a nonionic substituent, Y denotes hydrogen or halogen and n denotes a number from 0 to 3 as well as their production and their use for dyeing and printing organic materials.

3 Claims, No Drawings

QUINOPHTHALONE DYESTUFFS

The subject of the present invention are quinophthalone dyestuffs which are free of sulphonic acid groups, of the formula

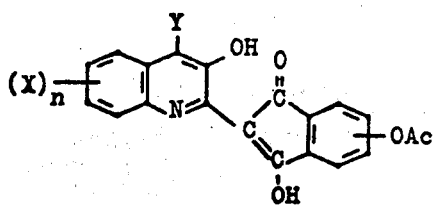

(I)

in which
Ac denotes an acyl radical,
X denotes a non-ionic substituent,
Y denotes hydrogen or halogen and
n denotes a number from 0 to 3 as well as their manufacture and use for dyeing organic materials, especially for dyeing and printing hydrophobic fibre materials.

The expression "acyl" is to be understood in the broadest sense, say according to the definition in Hackh's Chemical Dictionary (1953), as the radical of an organic acid of the general formula R—CO— or R—$SO_2$—.

As examples of acyl radicals there may be mentioned: alkylcarbonyl, arylcarbonyl, heterylcarbonyl, alkoxycarbonyl, aryloxycarbonyl, alkylsulphonyl, arylsulphonyl as well as alkylaminosulphonyl and dialkylaminosulphonyl radicals.

Suitable alkylcarbonyl radicals are those with 1 to 18 C atoms in the optionally unsaturated alkyl radical, which can carry further substituents such as, for example, halogen, nitrile, hydroxyl, $C_1$–$C_4$-alkoxy, phenoxy or optionally substituted phenyl.

In particular there may be mentioned: acetyl, propionyl, butyryl, 1-methyl-butyryl, 2-methyl-butyryl, 1-ethyl-butyryl, dimethyl-propionyl, pentanoyl, hexanoyl, 1-ethyl-hexanoyl, heptanoyl, octanoyl, nonanoyl, decanoyl, dodecanoyl, tetradecanoyl, hexadecanoyl, octadecanoyl, ethoxyacetyl, cyclohexanecarbonyl, 4-methylcyclohexanecarbonyl, 3,5-dimethylcyclohexanecarbonyl, phenylacetyl, β-phenylpropionyl, 4-methylphenylacetyl, phenoxyacetyl, 4-chlorophenoxyacetyl and cinnamoyl.

Suitable arylcarbonyl radicals are phenylcarbonyl and naphthylcarbonyl radicals which can optionally be substituted by halogen, $C_1$–$C_4$-alkyl, nitro, nitrile, hydroxyl, phenyl, phenoxy or $C_1$–$C_4$-alkoxy.

In particular: benzoyl, 2-, 3- and 4-chlorobenzoyl, 2-, 3- and 4-toloyl, 4-methoxybenzoyl, 4-ethoxybenzoyl, 3- and 4-nitrobenzoyl, 2,3-dichlorobenzoyl, 3,5-dimethylbenzoyl, 4-phenylbenzoyl, naphthoyl-1, naphthoyl-2, 1-hydroxy-naphthoyl-2 and 2-methoxy-naphthoyl-1.

Suitable herylcarbonyl radicals are radicals of 5-membered or 6-membered aromatic-heterocyclic carboxylic acids.

In particular: radicals of furane-2-carboxylic acid, thiophene-2-carboxylic acid, pyrrole-2-carboxylic acid, pyridine-2(3,4)-carboxylic acid, pyrimidine-4-carboxylic acid and quinoline-6-carboxylic acid.

Suitable alkoxycarbonyl radicals are those with 1 to 5 C atoms in the alkoxy radical, which can be further substituted by optionally substituted phenyl.

In particular there may be mentioned: methoxycarbonyl, ethoxycarbonyl, n-propoxycarbonyl, n-butoxycarbonyl, n-amyloxycarbonyl, benzyloxycarbonyl and 4-chlorobenzyloxycarbonyl.

Suitable aryloxycarbonyl radicals are phenoxycarbonyl radicals which are optionally substituted by halogen, $C_1$–$C_4$-alkyl or $C_1$–$C_4$-alkoxy, such as, for example, phenoxycarbonyl, 4-chlorophenoxycarbonyl, 4-tolyloxycarbonyl and 2,4-dichlorophenoxycarbonyl.

Suitable alkylsulphonyl radicals are those with 1 to 18 C atoms in the alkyl radical, which can be substituted further, for example by hydroxyl, $C_1$–$C_4$-alkoxy, halogen and nitrile.

In particular: methylsulphonyl, ethylsulphonyl, n-propylsulphonyl, n-butylsulphonyl, n-octylsulphonyl, n-dodecylsulphonyl, n-hexadecylsulphonyl, β-hydroxyethylsulphonyl, β-methoxyethylsulphonyl, β-ethoxyethylsulphonyl, β-cyanoethylsulphonyl, cyclohexylsulphonyl and 4-methylcyclohexylsulphonyl.

Suitable arylsulphonyl radicals are phenylsulphonyl and naphthylsulphonyl radicals which can optionally be substituted by $C_1$–$C_4$-alkyl, $C_1$–$C_4$-alkoxy, halogen, $C_1$–$C_4$-alkylmercapto, nitro, $C_1$–$C_4$-alkylcarbonylamino and optionally substituted phenyl and phenoxy.

In particular: phenylsulphonyl, 4-tolylsulphonyl, 4-methoxyphenylsulphonyl, 4-isopropylphenylsulphonyl, 2- or 4-chlorophenylsulphonyl, 2,4-dichlorophenylsulphonyl, 4-methylmercaptophenylsulphonyl, 4-nitrophenylsulphonyl, 4-acetaminophenylsulphonyl, 1-naphthylsulphonyl and 2-naphthylsulphonyl.

Suitable alkylaminosulphonyl and dialkylaminosulphonyl radicals are those with 1 to 4 C atoms in the particular alkyl radical, such as methylaminosulphonyl, ethylaminosulphonyl, dimethylaminosulphonyl, diethylaminosulphonyl, di-n-propylaminosulphonyl and di-n-butylaminosulphonyl.

Possible non-ionic substituents X are all substituents which are customary in dyestuff chemistry and do not dissociate in an aqueous medium, but especially halogen, such as chlorine and bromine, $C_1$–$C_4$-alkyl groups, nitro groups, phenyl groups and $C_1$–$C_4$-alkylcarbonyl groups.

Bromine may be mentioned as a particularly suitable halogen atom Y.

Preferred dyestuffs within the scope of the formula (I) are those of the formula

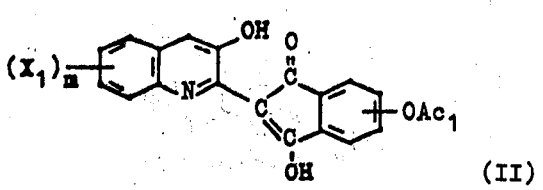

(II)

in which
Ac₁ denotes an alkylsulphonyl or arylsulphonyl radical,
X₁ denotes halogen or alkyl and
m represents a number from 0 to 2.

A particularly preferred embodiment of the dyestuffs according to the invention corresponds to the formula

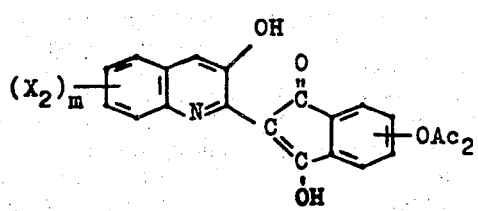

(III)

in which
Ac₂ represents a phenylsulphonyl radical which is optionally substituted by halogen, C₁–C₄-alkyl, C₁–C₄-alkoxy, nitro or CH₃S-, or represents a C₁–C₄-alkyl-sulphonyl radical,
X₂ denotes chlorine, bromine, methyl or ethyl and
m represents a number from 0 to 2.

The new dyestuffs of the formula (I) are obtained either by reacting acyloxyphthalic acids or their anhydrides, of the formula

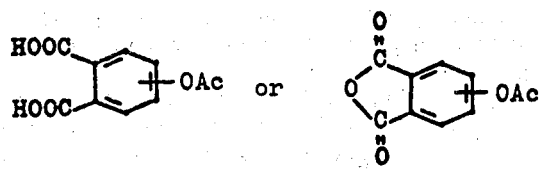

(IV)

in which
Ac has the indicated meaning, with 3-hydroxyquinaldines of the formula

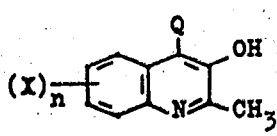

(V)

in which
X and n have the indicated meaning and
Q represents hydrogen or a carboxyl group,
in which case the carboxyl group Q which may be present is split off, or by acylating hydroxyquinophthalones of the formula

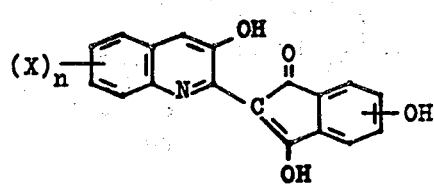

(VI)

in which
X and n have the indicated meaning and subsequently optionally introducing a halogen atom, preferably a bromine atom, into the reaction products in the p-position to the quinoline nitrogen atom.

The condensation of the acyloxyphthalic acids or their anhydrides (IV) with the hydroxyquinaldines (V) takes place in a manner which is in itself known (compare, for example, U.S. Pat. No. 3,023,213, U.S. Pat. No. 3,023,214 and British Pat. No. 693,686). Appropriately, it is carried out in the presence of an organic solvent which is inert under the reaction conditions. Examples of suitable solvents are: chlorobenzene, chlorotoluene, o-dichlorobenzene, nitrobenzene, tetralin, N-methylpyrrolidone, dichlorotoluene, trichlorobenzene and others.

In carrying out this condensation in practice, the procedure followed is preferably that the reactants (IV) and (V) are reacted in the molar ratio of 1 : 1 in one of the above-mentioned high-boiling organic solvents at temperatures above 100°C, preferably 160° – 210°C, optionally in an inert gas atmosphere or with the addition of catalysts, such as zinc chloride or phosphoric acid. It is however also possible to melt the starting materials together, in the molar ratio of 1 : 1, without conjoint use of a solvent, at temperatures of 150° – 250°C, preferably 180° – 200°C, and in this way to arrive at the compounds (I) according to the invention.

Examples of suitable starting materials of the formula (IV) are: 4-(phenylsulphonyloxy)-phthalic acid, 3-(phenylsulphonyloxy)-phthalic acid, 4-(4'-methylphenylsulphonyloxy)-phthalic acid, 3-(3'-methylphenylsulphonyloxy)-phthalic acid, 4-(2'-methylphenylsulphonyloxy)-phthalic acid, 4-(4'-tert.-butylphenylsulphonyloxy)-phthalic acid, 4-(2',4'-dimethylphenylsulphonyloxy)-phthalic acid, 4-(4'-chlorophenylsulphonyloxy)-phthalic acid, 4-(3'-chlorophenylsulphonyloxy)-phthalic acid, 3-(2'-chlorophenylsulphonyloxy)-phthalic acid, 4-(4'-fluorophenylsulphonyloxy)-phthalic acid, 4-(4'-bromophenylsulphonyloxy)-phthalic acid, 4-(4'-nitro-phenylsulphonyloxy)-phthalic acid, 4-(3'-nitro-phenylsulphonyloxy)-phthalic acid, 4-(3',4'-dichloro-phenylsulphonyloxy)-phthalic acid, 4-(4'-methyl-3'-nitro-phenylsulphonyloxy)-phthalic acid, 4-(4'-methoxy-phenylsulphonyloxy)-phthalic acid, 3-(4'-methoxy-phenylsulphonyloxy)-phthalic acid, 4-(3'-methoxy-phenylsulphonyloxy)-phthalic acid, 4-(4'-ethoxy-phenylsulphonyloxy)-phthalic acid, 4-(3'-butoxy-phenylsulphonyloxy)-phthalic acid, 4-(methylsulphonyloxy)-phthalic acid, 3-(methylsulphonyloxy)-phthalic acid, 4-(ethylsulphonyloxy)-phthalic acid, 4-(n-butylsulphonyloxy)-phthalic acid or 4-(cyclohexylsulphonyloxy)-phthalic acid or their anhydrides.

Further examples of starting compounds of the formula (IV) are: 4-(acetoxy)-phthalic acid, 4-(propionyloxy)-phthalic acid, 4-(butyryloxy)-phthalic acid, 4(cyclohexylcarbonyloxy)-phthalic acid, 4-(benzoyloxy)-phthalic acid, 3-(benzoyloxy)-phthalic acid, 4-(methyl-benzoyloxy)-phthalic 4-(ethyl-benzoyloxy)-phthalic acid, 3-(chloro-benzoyloxy)-phthalic acid, 4-(chloro-benzoyloxy)-phthalic acid, 4-(dichloro-benzoyloxy)-phthalic acid, 4-(chloromethyl-benzoyloxy)-phthalic acid, 4-(dimethyl-benzoyloxy)-phthalic acid, 4-(tert.-butyl-benzoyloxy)-phthalic acid, 4-(fluoro-benzoyloxy)-phthalic acid, 4-(nitrobenzoyloxy)-phthalic acid, 4-(acetylamino-benzoyloxy)-phthalic acid, 4-(methylmercapto-benzoyloxy)-phthalic acid, 4-(methylsulphonyl-benzoyloxy)-phthalic acid, 4-(methoxy-benzoyloxy)-phthalic acid, 4-(ethoxy-benzoyloxy)-phthalic acid and 4-(butoxy-benzoyl)-phthalic acid or their anhydrides.

Examples of suitable starting compounds of the formula (V) are: 3-hydroxy-quinaldine, 3-hydroxy-quinaldine-4-carboxylic acid, 3-hydroxy-5,7-dimethyl-quinaldine, 3-hydroxy-6,8-dichloro-quinaldine, 3-hydroxy-6-bromo-quinaldine and 3-hydroxy-6,8-dibromo-quinaldine.

The hydroxyquinophthalones (VI) have not hitherto been described. These compounds are obtained in a manner which is in itself known by condensation of 3- or 4-hydroxyphthalic acid or their anhydrides with corresponding 3-hydroxyquinaldines.

The acylation of the hydroxyquinophthalones (VI) also takes place in a manner which is in itself known, by reaction of appropriate acylating agents, the reaction preferably being carried out in the presence of an inert organic solvent and, optionally, of an acid acceptor.

Examples of suitable starting materials of the formula (VI) are: 2-(3'-hydroxy-2-quinolyl)-4-hydroxy-indanedione-1,3, 2-(3'-hydroxy-2'-quinolyl)-5-hydroxy-indanedione-1,3, 2-(3'-hydroxy-5',7'-dimethyl-2'-quinolyl)-5-hydroxy-indanedione-1,3, 2-(3'-hydroxy-6',8'-dichloro-2'-quinolyl)-5-hydroxy-indanedione-1,3, 2-(3'-hydroxy-6',8'-dibromo-2'-quinolyl)-5-hydroxy-indanedione-1,3, 2-(3'-hydroxy-6'-bromo-2'-quinolyl)-5-hydroxy-indanedione-1,3 or 2-(3'-hydroxy-5'-ethyl-2'-quinolyl)-5-hydroxy-indanedione-1,3.

Suitable acylating agents for the esterification of the compounds (VI) are functional acid derivatives, such as acid anhydrides and acid halides of aliphatic, aromatic and heterocyclic carboxylic acids, sulphonic acid halides or halogenocarbonic acid esters.

As examples there may be mentioned the anhydrides, chlorides or bromides of acetic acid, chloroacetic acid, propionic acid, butyric acid, acrylic acid, pentanecarboxylic acid, hexanecarboxylic acid, heptanecarboxylic acid, decanoic acid, dodecanoic acid, tetradecanoic acid, hexadecanoic acid, octadecanoic acid, crotonic acid, isobutyric acid, 2-methylbutyric acid, trimethylacetic acid, 2-ethylbutyric acid, 2-ethyl-caproic acid, coconut fatty acid, methacrylic acid, undecylenic acid, oleic acid, methoxyacetic acid, ethoxyacetic acid, acetoacetic acid, cyanoacetic acid, butoxyacetic acid, cyclohexanecarboxylic acid, benzoic acid, chlorobenzoic acid, methylbenzoic acid, ethylbenzoic acid, p-tert.-butylbenzoic acid, methoxybenzoic acid, ethoxybenzoic acid, dichlorobenzoic acid, phenylbenzoic acid, phenoxybenzoic acid, benzophenonecarboxylic acid, phenoxyacetic acid, phenylacetic acid, β-phenylpropionic acid, cinnamic acid, naphthoic acid, hydroxynaphthoic acid, furanecarboxylic acid, thiophenecarboxylic acid, pyrrolecarboxylic acid, pyridinecarboxylic acid, quinolinecarboxylic acid and benzthiazolecarboxylic acid.

Examples of sulphonic acid halides are: methanesulphochloride, methane-sulphobromide, ethane-sulphochloride, n-propane-sulphochloride, n-butane-sulphochloride, isopentane-sulphochloride, hexane-sulphochloride, octane-sulphochloride, decane-sulphochloride, tetradecane-sulphochloride, octadecane-sulphochloride, β-methoxyethane-sulphochloride, β-ethoxyethane-sulphochloride, β-butoxyethane-sulphochloride, N,N-dimethylsulphamic acid chloride, cyclohexane-sulphochloride, phenylmethane-sulphochloride, benzene-sulphochloride, methylbenzene-sulphochloride, ethylbenzene-sulphochloride, isopropylbenzene-sulphochloride, dimethylbenzene-sulphochloride, methoxybenzene-sulphochloride, ethoxybenzene-sulphochloride, butoxy-benzene-sulphochloride, methylmethoxybenzene-sulphochloride, methylmercapto-benzene-sulphochloride, chlorobenzene-sulphochloride, nitrobenzene-sulphochloride, dichlorobenzene-sulphochloride, bromobenzene-sulphochloride, naphthalene-sulphochloride and benzthiazole-sulphochloride.

Examples of halogenoformic acid esters are: chloroformic acid methyl ester, chloroformic acid ethyl ester, chloroformic acid propyl ester, chloroformic acid butyl ester, chloroformic acid amyl ester, chloroformic acid cyclohexyl ester, chloroformic acid benzyl ester and chloroformic acid phenyl ester.

Examples of suitable solvents for the acylation are: pyridine, methylpyridine, dimethylformamide, dimethylacetamide, dimethylsulphoxide, sulpholane, N-methylpyrrolidone, N-ethylpyrrolidone and ethylene glycol monomethyl ether.

Suitable acid acceptors for the acylation are: sodium acetate or potassium acetate, sodium bicarbonate or potassium bicarbonate, sodium carbonate or potassium carbonate, triethylamine or pyridine.

Appropriately, th acylation is carried out by dissolving the hydroxyquinophthalones (VI) in one of the abovementioned solvents and treating them with at least one equivalent of one of the abovementioned acylating agents, if appropriate in the presence of at least one equivalent of an acid acceptor, at temperatures of 0° – 150°C, preferably 25°– 100°C. The reaction products are separated out by adding methanol and/or water.

The acylation can however also be carried out in an aqueous medium according to Schotten-Baumann, in the presence of at least one equivalent of an acid acceptor.

The post-halogenation, preferably the post-bromination, which may require to be carried out, of the condensation products of (IV) and (V) or of the acylation products of (VI) can also be carried out according to known methods, for example according to the instructions provided in German Patent Specification No. 1,229,663 and British Patent Specification No. 1,263,345.

The new dyestuffs of the formula (I), optionally also mixed with one another, are outstandingly suitable for dyeing organic materials, especially for dyeing and/or printing fibres, filaments, woven fabrics, knitted fabrics, tapes, films or sheets of synthetic origin, but above all for dyeing and printing hydrophobic fibre materials. They are dyed or printed according to the methods customary for the fibres. Cellulose triacetate fibres and polyamide fibres can be dyed at about 100°C from aqueous liquors, if appropriate in the presence of the customary auxiliaries. When dyeing fibres of aromatic polyesters, for example polyethylene glycol terephthalate, the customary carriers can be added to the dyebath, or the dyeing can be carried out without addition of carrier at 120°–130°C under pressure. The dyeings can also be fixed by a short heat treatment at 190°–220°X. At the same time it is advantageous if, before being used according to the customary methods, the dyestuffs are brought to a finely divided state, for example by grinding or kneading preferably in the presence of customary dispersing agents.

Some types of the dyestuffs according to the invention are furthermore suitable for dyeing synthetic fibre materials from organic solvents, in accordance with the so-called continuous process. The dyeing conditions suitable for this are known and have been described in more detail, for example in Belgian Patent Specification No. 753,315. In this process it is frequently advisable to use mixtures of the dyestuffs according to the invention instead of the individual dyestuffs.

Using the abovementioned processes, the dyestuffs of the formula (I) give, on the fibres mentioned, strong yellow dyeings of good fastness properties, especially good fastness to light and sublimation.

In the examples which follow, unless otherwise stated, the parts quoted are parts by weight.

EXAMPLE 1

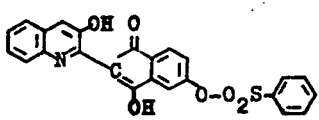

a. 35 parts of 4-benzenesulphonyloxyphthalic acid (manufactured by esterifying 4-hydroxyphthalic acid with benzene-sulphonic acid chloride at pH 9.0 – 9.5 in an aqueous medium), 20.4 parts of 3-hydroxy-quinaldine-4-carboxylic acid and 35 parts of anhydrous sodium sulphate are introduced into 500 parts of 2,4-dichlorotoluene. The reaction mixture is warmed to 180°C whilst passing a slight stream of nitrogen over it and is stirred for 20 hours at this temperature. After cooling to 140°C, the sodium sulphate is separated off, together with small amounts of impurities, and the filtrate is cooled to 80°C. 4 parts of triethylamine are added, followed by 7.2 parts of benzenesulphonic acid chloride after having stirred the mixture for a further 10 minutes. After 30 minutes, the mixture is cooled to 20°C and the golden yellow crystals are filtered off and briefly washed with methanol. After drying, 22 parts of the above dyestuff are obtained.

Further dyestuff can be obtained by concentrating the filtrate.

b. 1 part of this dyestuff, which has first been brought to a finely divided state in the presence of dispersing agents, is dispersed in 400 parts of water. 100 parts of polyester fibres (polyethylene terephthalate) are dyed for 120 minutes at the boil in the dyebath obtained, in the presence of 15 parts of o-cresotic acid methyl ester as a carrier. A strong, clear yellow dyeing of excellent fastness properties, especially very good fastness to light and sublimation, is obtained.

EXAMPLE 2

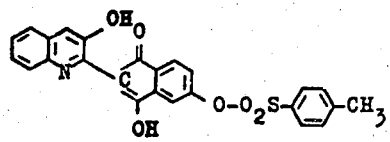

a. 35 parts of 4-p-toluenesulphonyloxy-phthalic acid (manufactured by reaction of the 4-hydroxyphthalic acid with p-toluenesulphonic acid chloride at pH 9 in an aqueous medium) and 20.4 parts of 3-hydroxy-quinaldine-4-carboxylic acid are introduced into 150 parts of trichlorobenzene. The reaction mixture is warmed to 210°C and is stirred for 2 hours at this temperature, in the course of which the resulting water, together with a little trichlorobenzene, is distilled off. After the reaction solution has been clarified at 140°C, 4 parts of triethylamine are added at 80°C followed, after brief stirring, by 7.6 parts of p-toluenesulphonic acid chloride. After 30 minutes the mixture is cooled to 20°C and diluted with methanol. The reaction product which has separated out is filtered off and washed with methanol and subsequently with water. After drying, 24 parts of a dyestuff of the formula indicated above are obtained.

b. If the abovementioned 4-p-toluenesulphonyloxy-phthalic acid is replaced by the equivalent amount of 4-o-toluenesulphonyloxy-phthalic acid, the o-toluenesulphonic acid ester of dihydroxyquinophthalone is obtained analogously.

c. 100 parts of polyester fibres (polyethylene terephthalate) are dyed with 1 part of this dyestuff, which has beforehand been brought to a finely divided state by means of the customary auxiliaries, in 3,000 parts of water for 1 hours at 125° – 130°C under pressure. A strong, clear yellow dyeing of excellent fastness properties is obtained.

d. 0.1 part of the dyestuff manufactured according to Example 2a is mixed with 100 parts of polystyrene granules and the mixture is fused in an extruder at 200° – 220°C. Thereafter it is converted into a ribbon, cooled and granulated. After processing on, for example, a screw injection moulding machine, yellow mouldings of high transparency are obtained, the dyestuff used being distinguished by high heat stability and very good fastness to light. Equivalent yellow dyeings are obtained in polymethacrylates and polycarbonates.

If additionally 0.1 part of titanium dioxide is added, an attractive opaque results.

EXAMPLE 3 a. 35 parts of 4-phenylsulphonyloxyphthalic acid and 20.4 parts of 3-hydroxy-quinaldine-4-carboxylic acid are introduced into 340 parts of 2,4-dichloro-toluene. The mixture is warmed to 200°C whilst passing a slow stream of nitrogen over it and is stirred for 5 hours at this temperature. During this time the resulting water is distilled off, together with about 100 parts of dichlorotoluene. The reaction solution is filtered at approx. 140°C and is subsequently steam-distilled. The residue left is filtered off, washed with methanol and water and dried. In this way, 27 parts of a dyestuff which is identical to that indicated in Example 1a are obtained.

b. If the 3-hydroxy-quinaldine-4-carboxylic acid used in Example 3a is replaced by 16 parts of 3-hydroxy-quinaldine and in other respects the procedure indicated is followed, the same dyestuff is obtained.

c. 100 parts of polyester fibres (obtained by polycondensation of terephthalic acid with dimethylolcyclohexane) are dyed for 1 hour at 125° –130°C under pressure with 1 part of this dyestuff, which has beforehand been brought to a finely divided state by means of a customary auxiliaries, in 3,000 parts of water. A strong yellow dyeing of very good fastness properties is obtained.

EXAMPLE 4

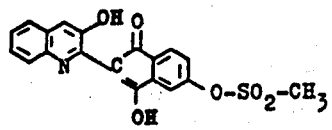

a. 6 parts of 3,5'-dihydroxy-quinophthalone (manufactured by condensation of equimolar amounts of 3-hydroxy-quinaldine-4-carboxylic acid and 4-hydroxy-phthalic acid or its anhydride) are suspended in 120 parts of 2,4-dichloro-toluene. The mixture is warmed to 80°C and 3 parts of triethylamine are added, followed after 15 minutes by 3.2 parts of methane-sulphonic acid chloride. After a further 30 minutes the mixture is cooled to 20°C and stirred until crystallisation is complete and the product is filtered off and washed with methanol. After drying, 4.9 parts of the abovementioned dyestuff are obtained.

Further dyestuff can be obtained by concentrating the filtrate.

b. A previously cleaned and thermoset fabric of polyethylene terephthalate is printed with a paste consisting of the following components: 20 g of dyestuff, obtained according to Example 4a, in a finely divided form, 520 g of water, 450 g of crystal gum, 1:2, and 10 g of cresotic acid methyl ester. To fix the dyestuff, the printed and dried goods are treated with hot air at 200°C for 40 seconds. After soaping, rinsing and drying, a clear yellow print of very good fastness to light and to sublimation is obtained.

EXAMPLE 5

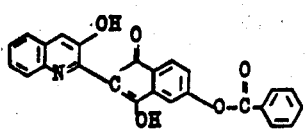

a. 3 parts of 3,5'-dihydroxy-quinophthalone - obtained by condensation of 3-hydroxy-quinaldine-4-carboxylic acid and 4-hydroxy-phthalic acid - are dissolved in 30 parts by volume of pyridine. After adding 3 parts of benzoic anhydride the reaction mixture is heated to the boil for 5 minutes. After cooling, the dyestuff which has separated out is filtered off, washed with methanol and water and dried. 3.4 parts of the indicated compound are obtained.

b. 100 parts of polyester fibres (polyethylene terephthalate) are dyed for 1 hour at 125° – 130°C, under pressure, with 1 part of this dyestuff, which has beforehand been brought to a finely divided state with the customary auxiliaries, in 3,000 parts of water. A clear, strong yellow dyeing of very good fastness to light and to sublimation is obtained.

c. 6 parts of 3,5'-dihydroxy-quinophthalone are esterified with 2.8 parts of benzoyl chloride in accordance with the instructions of Example 4a. After working up, 4.9 parts of the abovementioned dyestuff, which dyes polyester materials in yellow shades, are obtained.

d. If the 3,5'-dihydroxy-quinophthalone employed in Example 5a is replaced by the equivalent amount of 3,4'-dihydroxy-quinophthalone (manufactured by condensation of 3-hydroxy-phthalic acid with 3-hydroxy-quinaldine-4-carboxylic acid) and in other respects the procedure indicated is followed, the isomeric benzoyloxy-hydroxyquinophthalone is obtained, which also yields yellow dyeings on polyester materials.

EXAMPLE 6

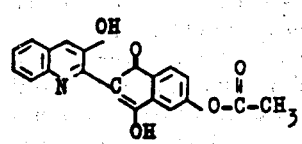

a. 5 parts of dihydroxyquinophthalone in 30 parts by volume of pyridine are heated to the boil with 3 parts of acetic anhydride, for 5 minutes. After cooling, the reaction mixture is diluted with 30 parts by volume of methanol. The dyestuff which has separated out is filtered off, washed with methanol and water and dried. 5.2 parts of the compound indicated above are obtained.

b. 100 parts of polyester fibres (obtained by polycondensation of terephthalic acid with dimethylolcyclohexane) are dyed for one hour at 125° – 130°C under pressure with 1 part of this dyestuff, which has beforehand been brought to a finely divided state by means of customary auxiliaries, in 3,000 parts of water. A strong, yellow dyeing of very good fastness to light and to sublimation is obtained.

EXAMPLE 7

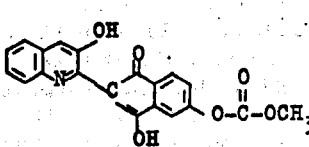

a. A solution of 5.7 parts of dihydroxyquinophthalone in 30 parts by volume of N-methylpyrrolidone is mixed with 4 parts of chloroformic acid methyl ester at room temperature. A mixture of 3 parts of triethylamine in 5 parts by volume of N-methylpyrrolidone is subsequently added dropwise in 5 minutes. After stirring for ½ an hour at room temperature, the reaction mixture is diluted with 30 parts by volume of methanol and filtered off. After washing with methanol and water, 5.2 parts of the indicated compound are obtained.

b. 1 part of this dyestuff, which has beforehand been brought to a finely divided state in the presence of dispersing agents, is dispersed in 400 parts of water. 100 parts of polyester fibres (polyethylene terephthatate) are dyed for 120 minutes at the boil in the resulting dyebath, in the presence of 15 parts of o-cresotic acid methyl ester as a carrier. A clear yellow dyeing of very good fastness properties, especially very good fastness to light and to sublimation, is obtained.

EXAMPLE 8

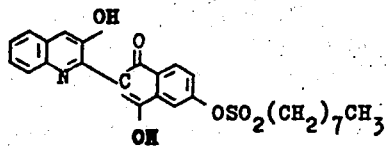

a. 10 parts of 3,5'-dihydroxy-quinophthalone are dissolved in 80 parts of pyridine. After adding 6 parts of triethylamine, the reaction mixture is treated with 8 parts of n-octane-sulphochloride. The mixture is stirred for 1 hour at room temperature and the resulting dyestuff is separated out by adding 100 parts of methanol and 20 parts of water. After filtration, and washing with a methanol/water mixture, 10.2 parts of the dyestuff indicated above are obtained.

b. A fabric of polyethylene terephthalate fibres is impregnated at room temperature with a clear yellow solution which contains 10 parts of the dyestuff according to Example 8a in 990 parts of tetrachloroethylene. After squeezing out to a weight increase of 60%, the fabric is dried for one minute at 80°C. Thereafter the dyestuff is fixed by heating the fabric to 190 –220°C for 45 seconds. The small proportion of dyestuff which has not been fixed is subsequently eluted by a brief treatment lasting 20 seconds in cold tetrachloroethylene. After drying, a clear yellow dyeing is obtained which is distinguished by its high dyestuff yield, very good build-up and excellent fastness properties, especially very good fastness to thermofixing, washing, rubbing and light.

Equivalent clear yellow dyeings were also obtained analogously on fabrics of
a. cellulose triacetate,
b. synthetic polyamides or polyurethanes and
c. polypropylene fibres; the only difference was that the thermosol treatment was carried out
in the case of (a) at 200° – 220°C,
in the case of (b) at 170° – 200°C and
in the case of (c) at 120° – 150°C.

Equivalent dyeings were also obtained if the 990 parts of tetrachloroethylene were replaced by the same amount of one of the following solvents: methylene chloride, chloroform, carbon tetrachloride, dichloroethane, trichloroethane, trichloroethylene, tetrachloroethane, dichloropropane, 1,1,1-trichloropropane, pentachloropropane, chlorobutane, dichlorobutane, dichlorohexane, 1,2,2-trifluoro-trichloroethane, 1,1,1-trifluoro-pentachloropropane and perfluoro-n-hexane.

EXAMPLE 9

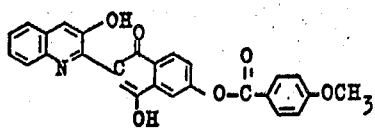

a. 3.2 parts of 3,5'-dihydroxy-quinophthalone in 40 parts of pyridine are heated to the boil with 3 parts of p-methoxybenzoyl chloride for 5 minutes. The resulting dyestuff is separated out by adding 50 parts of methanol and 50 parts of water. After filtration and washing with methanol and water, 4.2 parts of the compound indicated, which yields clear yellow dyeings of very good fastness properties on polyester materials, are obtained.

b. A fabric of polyester fibres (polyethylene terephthalate) is impregnated on a padder with a liquor which per liter contains 20 g of dyestuff of the above structure which has beforehand been brought to a finely divided state in the presence of dispersing agents. The fabric is squeezed out to a weight increase of 70% and is dried at 100°C. Thereafter, in order to fix the dyeing, the fabric is treated for 60 seconds with hot air at 190° – 220°C, rinsed, washed hot and dried. A strong yellow dyeing of very good fastness to light, sublimation and rubbing is obtained.

EXAMPLE 10

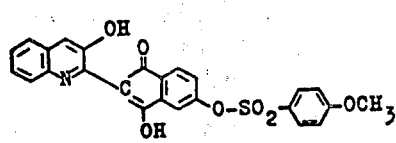

a. 3.5 parts of p-methoxy-benzene-sulphochloride are introduced into a mixture of 50 parts of pyridine, 4 parts of triethylamine and 4 parts of 3,5'-dihydroxy-quinophthalone at room temperature. The reaction mixture is stirred for 1 hour at room temperature and the resulting dyestuff is precipitated by adding 300 parts of methanol, filtered off and washed with methanol and water. 4.3 parts of the indicated compound, which gives clear yellow dyeings on polyester materials, are obtained.

b. 100 parts of polyamide fabric are dyed for 1 hour at 100°C with 1 part of the dyestuff manufactured in this manner, which has beforehand been brought to a finely divided state in accordance with the customary methods, in 4,000 parts of water. Thereafter, the fabric is rinsed warm and cold and is dried. A yellow dyeing of very good fastness to washing and to light is obtained.

EXAMPLE 11 – 92:

The 3-hydroxy-4'- or -5'-acyloxy-quinophthalones listed in the table, which give yellow dyeings of excellent fastness properties on woven fabrics or knitted fabrics of polyester, triacetate, polyamide, polyurethane or polyolefine fibres, are obtained according to analogous processes to those described in Examples 1 to 10.

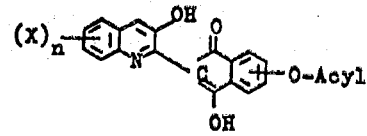

| Example | X | n | Acyl |
|---|---|---|---|
| 11 | H | — | $-SO_2-CH_3$ (4) |
| 12 | H | — | $-SO_2-C_2H_5$ (5) |
| 13 | H | — | $-SO_2-C_2H_4-Cl$ (5) |
| 14 | H | — | $-SO_2-C_2H_4-OCH_3$ (5) |
| 15 | H | — | $-SO_2-(CH_2)_3CH_3$ (5) |
| 16 | H | — | $-SO_2(CH_2)_5-CH_3$ (5) |
| 17 | H | — | $-SO_2-(CH_2)_9CH_3$ (5) |
| 18 | H | — | $-SO_2-\text{C}_6\text{H}_{11}$ (5) |
| 19 | H | — | $-SO_2-CH_2-\text{C}_6\text{H}_5$ (5) |
| 20 | H | — | $-SO_2-\text{C}_6\text{H}_5$ (4) |
| 21 | H | — | $-SO_2-\text{C}_6\text{H}_3Cl_2$ (5) |
| 22 | 5′,7′—$CH_3$ | 2 | $-SO_2-\text{C}_6\text{H}_5$ (5) |
| 23 | 6′,8′—Cl | 2 | $-SO_2-\text{C}_6\text{H}_5$ (5) |
| 24 | 6,8′—Br | 2 | $-SO_2-\text{C}_6\text{H}_5$ (5) |
| 25 | 6′—Br | 1 | $-SO_2-\text{C}_6\text{H}_5$ (5) |
| 26 | 5′—$C_2H_5$ | 1 | $-SO_2-\text{C}_6\text{H}_5$ (5) |
| 27 | H | — | $-SO_2-\text{C}_6\text{H}_4-OCH_3$ (5) |
| 28 | H | — | $-SO_2-\text{C}_6\text{H}_4-OC_2H_5$ (5) |
| 29 | H | — | $-SO_2-\text{C}_6\text{H}_4-NO_2$ (5) |
| 30 | H | — | $-SO_2-\text{C}_6\text{H}_4-S-CH_3$ (5) |
| 31 | H | — | $-SO_2-\text{C}_6\text{H}_3(CH_3)(NO_2)$ (5) |
| 32 | H | — | $-SO_2-\text{C}_6\text{H}_4-NH-CO-CH_3$ (5) |
| 33 | H | — | $-SO_2-\text{naphthyl}$ (5) |
| 34 | H | — | $-SO_2-\text{C}_6\text{H}_4-Cl$ (5) |
| 35 | H | — | $-SO_2-\text{C}_6\text{H}_3(CH_3)(Cl)$ (5) |
| 36 | 5′—$CH_3$—6′—Cl | 2 | $-SO_2-\text{C}_6\text{H}_3(CH_3)_2$ (5) |
| 37 | 7′—$CH_3$ | 1 | $-SO_2-\text{naphthyl}$ (5) |
| 38 | H | — | $-SO_2-N(CH_3)_2$ (5) |
| 39 | H | — | $-SO_2-N(C_2H_5)_2$ (5) |
| 40 | H | — | $-SO_2-N(C_4H_{9(n)})_2$ (5) |
| 41 | H | — | $-CO-C_2H_5$ (5) |
| 42 | 5′,7′—$CH_3$ | 2 | $-CO-C(CH_3)_3$ (5) |
| 43 | H | — | $-CO-C_3H_{7(n)}$ (5) |
| 44 | H | — | $-CO-CH(CH_3)_2$ (5) |

-continued

| Example | X | n | Acyl |
|---|---|---|---|
| 45 | H | — | —CO—CH$_2$—CH(CH$_3$)—CH$_3$ (5) |
| 46 | H | — | —CO—CH$_2$—Cl (5) |
| 47 | H | — | —CO—CH$_2$—OC$_2$H$_5$ (5) |
| 48 | H | — | —CO—CH$_2$—C$_6$H$_5$ (5) |
| 49 | H | — | —CO—CH$_2$—CN (5) |
| 50 | 4′—Br | 1 | —CO(CH$_2$)$_4$—CH$_3$ (5) |
| 51 | H | — | —CO—CH$_2$—C(CH$_3$)$_2$—CH$_3$ (5) |
| 52 | H | — | —CO—CH(C$_2$H$_5$)(C$_4$H$_9$) (5) |
| 53 | H | — | —CO—(CH$_2$)$_9$—CH$_3$ (5) |
| 54 | H | — | —CO—(CH$_2$)$_{16}$—CH$_3$ (5) |
| 55 | H | — | —CO—cyclohexyl (5) |
| 56 | H | — | —CO—C$_6$H$_5$ (4) |
| 57 | H | — | —CO—C$_6$H$_4$—Cl (5) |
| 58 | H | — | —CO—C$_6$H$_4$—Cl (5) |
| 59 | H | — | —CO—C$_6$H$_3$Cl$_2$ (5) |
| 60 | H | — | —CO—C$_6$H$_4$—CH$_3$ (5) |
| 61 | 5′,7′—CH$_3$ | 2 | —CO—C$_6$H$_4$—CH$_3$ (5) |
| 62 | H | — | —CO—C$_6$H$_4$—C(CH$_3$)$_3$ (5) |
| 63 | H | — | —CO—C$_6$H$_4$—C$_2$H$_5$ (5) |
| 64 | H | — | —CO—C$_6$H$_4$—C$_6$H$_5$ (5) |
| 65 | H | — | —CO—C$_6$H$_4$—O—C$_6$H$_5$ (5) |
| 66 | H | — | —CO—C$_6$H$_4$—F (5) |
| 67 | H | — | —CO—C$_6$H$_4$—NO$_2$ (5) |
| 68 | H | — | —CO—C$_6$H$_4$—NO$_2$ (5) |
| 69 | H | — | —CO—C$_6$H$_3$(CH$_3$)$_2$ (5) |
| 70 | H | — | —CO—C$_6$H$_3$(CH$_3$)(Cl) (5) |
| 71 | H | — | —CO—C$_6$H$_3$Cl$_2$ (5) |

| Example | X | n | Acyl |
|---|---|---|---|
| 72 | H | — | 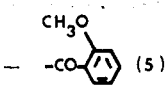 -CO-C₆H₄-OCH₃ (5) [methoxy ortho] |
| 73 | H | — | -CO-C₆H₄-OCH₃ (4) |
| 74 | H | — | -CO-C₆H₄-OCH(CH₃)₂ (5) |
| 75 | H | — | —COOC$_2$H$_5$(5) |
| 76 | H | — | —COOC$_3$H$_{7(n)}$(5) |
| 77 | H | — | —COOC$_4$H$_{9(n)}$(5) |
| 78 | H | — | -COO-C₆H₅ (5) |
| 79 | H | — | -COO-C₆H₄-Cl (5) |
| 80 | H | — | -CO-(thienyl) (5) |
| 81 | H | — | -CO-(furyl) (5) |
| 82 | H | — | -CO-(pyridyl) (5) |
| 83 | H | — | -SO$_2$-benzothiazolyl-C-Cl (5) |
| 84 | H | — | -CO-(pyridyl-N) (5) |
| 85 | H | — | —CO—CH$_2$—NHC$_2$H$_5$(5) |
| 86 | H | — | —CO—CH$_2$—NH—C$_3$H$_6$OCH$_3$(5) |
| 87 | H | — | -CO-C₆H₄-CF$_3$ (5) |
| 88 | H | — | -CO-C₆H₄-NH-CO-CH$_3$ (5) |
| 89 | H | — | -CO-C₆H₄-SCH$_3$ (5) |
| 90 | H | — | —SO$_2$—C$_2$H$_4$—OC$_2$H$_5$(5) |
| 91 | H | — | —SO$_2$—C$_2$H$_4$—OC$_4$H$_{9(n)}$(5) |
| 92 | H | — | -SO$_2$-C₆H$_{10}$-CH$_3$ (5) |

EXAMPLE 93

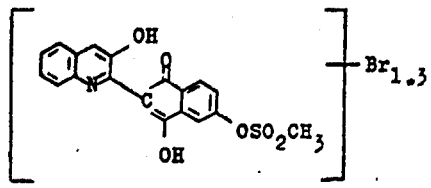

a. 5 parts of 3,5'-dihydroxyquinophthalone are dissolved in 50 parts of concentrated sulphuric acid. 2.7 parts of bromine are added dropwise over the course of ½ hour at room temperature, after which the reaction mixture is stirred for 2 hours at the same temperature. The reaction mixture is added to 300 parts of ice water, and the precipitate is filtered off, washed with dilute bisulphite solution and water and dried. 5.1 parts of a brominated dihydroxyquinophthalone which contains approx. 1.8 atoms of bromine per molecule are obtained.

b. 4.7 parts of the bromination product obtained according to Example 93a are introduced into 40 parts of pyridine and 4 parts of triethylamine and warmed to 60°C. 4 parts of methane-sulphochloride are added and the reaction mixture is stirred for a further 10 minutes, cooled and treated with 60 parts of methanol and 10 parts of water. The dyestuff which has separated out is filtered off and washed with methanol and water. 4.6 parts of a compound which contains 1.3 atoms of bromine per molecule and dyes polyester materials in yellow shades having good fastness properties are obtained.

c. If 3 parts of benzoyl chloride are added to a mixture of 4 parts of the quinophthalone manufactured according to Example 93a and 30 parts of pyridine and the mixture is warmed to 60°C for approx. 5 minutes and then worked up in the manner described earlier, 4.1 parts of a brominated benzoyloxyhydroxy-quinophthalone are obtained, which contains 1.5 atoms of bromine per molecule and also dyes polyester materials in a yellow colour.

EXAMPLE 94

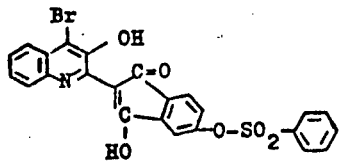

a. 5 parts of 3-hydroxy-5′-benzenesulphonyloxy-quinophthalone, manufactured according to Example 1a, are suspended in 200 parts of glacial acetic acid and 4.5 parts of bromine are added. The reaction mixture is stirred for 15 hours at room temperature and is subsequently filtered. The residue is washed with bisulphite solution and water and is dried. 5.5 parts of the indicated dyestuff, containing 15.0% of bromine, are obtained.

b. If the analogous bromination is carried out in 60 parts of dichlorotoluene with 1.8 parts of bromine at room temperature in approx. 7–8 hours, working up as described under 94a yields the same dyestuff, containing 14.3% of bromine.

c. A dyebath is prepared with 1 part of the above dyestuff, which has beforehand been brought to a finely divided state using the auxiliaries customary for this purpose, 6 parts of fatty alcohol sulphonate and 3,000 parts of water, and 100 parts of cellulose triacetate fibres are dyed in this bath for 1 hour at 100°C. A yellow dyeing of very good fastness to washing, thermofixing and light is obtained.

We claim:
1. Quinophthalone dyestuff of the formula

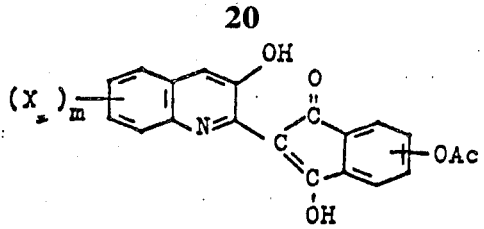

in which
Ac is phenylsulphonyl or phenylsulphonyl mono-or di-substituted by halogen, $C_1$-$C_4$-alkyl, $C_1$-$C_4$-alkoxy, nitro, or methylmercapto, provided that in the case of disubstituted nitro or disubstituted tertiary-butyl, the substituents will be on nonadjacent carbon atoms;
X is chlorine, bromine, or $C_1$-$C_4$-alkyl; and
m is 0, 1, or 2;
provided that when X is tertiary-butyl and m is 2 the tertiary-butyls are on nonadjacent carbon atoms.

2. Quinophthalone dyestuff according to claim 1 of the formula

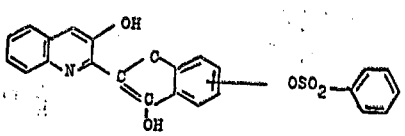

3. Quinophthalone dyestuff according to claim 1 of the formula

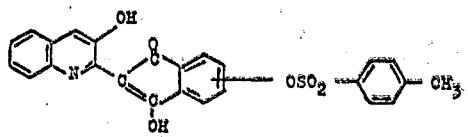

* * * * *